(12) United States Patent
Casalino et al.

(10) Patent No.: US 11,675,135 B2
(45) Date of Patent: Jun. 13, 2023

(54) ROTATABLE CONNECTOR FOR AN OPTICAL FIBER

(71) Applicant: BIOS SRL, Milan (IT)

(72) Inventors: Aldo Casalino, Vimodrone (IT); Lorenzo Casalino, Cologno Monzese (IT)

(73) Assignee: BIOS SrL, Milan (IT)

( * ) Notice: Subject to any disclaimer, the term of this patent is extended or adjusted under 35 U.S.C. 154(b) by 252 days.

(21) Appl. No.: 16/923,503

(22) Filed: Jul. 8, 2020

(65) Prior Publication Data

US 2021/0011222 A1 Jan. 14, 2021

Related U.S. Application Data

(60) Provisional application No. 62/872,265, filed on Jul. 10, 2019.

(51) Int. Cl.
*G02B 6/36* (2006.01)
*B23K 26/10* (2006.01)
*B23K 26/70* (2014.01)

(52) U.S. Cl.
CPC .......... *G02B 6/3604* (2013.01); *B23K 26/103* (2013.01); *B23K 26/70* (2015.10)

(58) Field of Classification Search
CPC ................................ G02B 6/3604; G02B 6/36
See application file for complete search history.

(56) References Cited

U.S. PATENT DOCUMENTS

| | | | | |
|---|---|---|---|---|
| 4,909,589 | A * | 3/1990 | Morris | G02B 6/3604 385/25 |
| 6,053,639 | A * | 4/2000 | Chen | G02B 6/3825 385/87 |
| 6,758,599 | B2 * | 7/2004 | Keselman | G02B 6/3604 385/60 |
| 8,616,785 | B2 * | 12/2013 | Carpenter | A61B 1/00128 385/89 |
| 2008/0118204 | A1 * | 5/2008 | Ankerhold | G02B 6/3604 385/51 |
| 2010/0040379 | A1 * | 2/2010 | Kragl | G02B 6/3604 398/141 |
| 2021/0011222 | A1 * | 1/2021 | Casalino | B23K 26/70 |

* cited by examiner

*Primary Examiner* — Tina M Wong
(74) *Attorney, Agent, or Firm* — ISUS Intellectual Property PLLC; Anthony Jason Mirabito

(57) ABSTRACT

A rotatable connector for rotatable mounting an optical fiber, comprising a hollow shaft for introducing and fixing an optical fiber mechanically to the hollow shaft, furthermore comprising one or more bearings, whereby, in the case of a two bearing construction, the interior of a first bearing is fixed onto the hollow shaft, as well as the interior of a second bearing being fixed onto the hollow shaft, whereby the second bearing is spaced apart from the first bearing, the exterior of at least one bearing is in contact with the interior of a hollow stationary part, the latter having a thread, which can be screwed together with the counter thread of a cap or cap nut, which may apply an axial clamping force onto the bearings, when tightened.

20 Claims, 3 Drawing Sheets

A-A

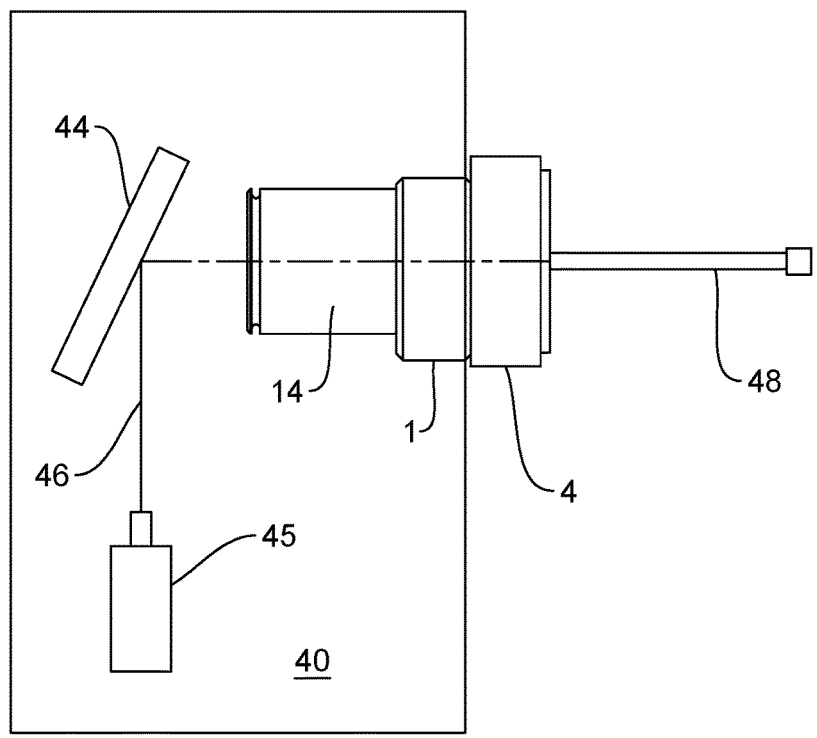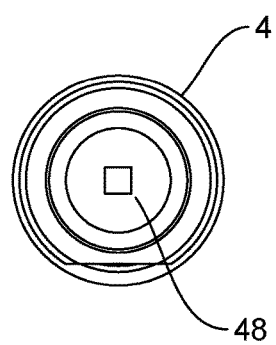
FIG. 4A
FIG. 4B

ROTATABLE CONNECTOR FOR AN OPTICAL FIBER

RELATED APPLICATION

This application claims the benefit and priority of U.S. Provisional Application No. 62/872,265, filed Jul. 10, 2019 and German Application No. 10 2019 118 643.9, filed Jul. 10, 2019.

DESCRIPTION

The invention relates to a rotatable connector and system for use with an optical fiber cable.

BACKGROUND

U.S. Pat. No. 5,872,879A describes connectors for connecting a rotatable optical fiber to a rotor shaft. Two ends of optical fibers are aligned axially by means of two rod lenses fixed on each end. One rod lens is rotatable with respect to the other rod lens, having a gap in between. Therefore, one ball bearing rotatably connects a tube, containing the stator fiber and corresponding rod lens with the second fiber end in a second tube.

U.S. Pat. No. 5,653,897A describes a laser welding apparatus having a fixed optical fiber providing a laser beam to a rotatable sleeve for distributing the beam radially. Therefore, a rotating cable interface assembly comprises a rotary joint with an upper rotary portion and a lower stationary portion in gliding contact. One ball bearing is used in addition for the purpose of connecting the rotating device and distance spacer in order to keep a radial distance between the device and the tube.

Utility model CN201622368 (U) relates to an optical fiber apparatus, and in particular to a rotatable optical fiber connector for a laser processor. The rotatable optical fiber connector holds an optical fiber with an inner rotatable holder. The rotatable connection with respect to the outer stationary part is achieved by two axially spaced bearings. The first bearing appears to be attached to an inner tube/holder next to a stop. An outer tube is attached afterwards and provides a spacing to a second bearing with is attached and fixed with a circular spring.

All prior art devices are difficult to assemble, comprise a large number of parts, cannot adjust the axial distance of its parts or do not allow fibers with different profiles. For example, prior art devices are not designed to account for the use of polygonal-shaped cross-sectional fibers, in which the torsional stresses may be greater than with the use of circular-shaped cross-sectional fibers. With the use of such polygonal-shaped fibers, it is important to reduce such stresses upon rotation of the fiber around its longitudinal axis during use.

SUMMARY OF THE INVENTION

One objective of all embodiments described herein is to eliminate or at least alleviate the problems discussed above.

One aspect of the present invention relates to a device, i.e. a rotatable mounting an optical fiber. The device comprises a hollow shaft for introducing an optical fiber, adapted to hold and fix the fiber mechanically (which means that further parts may be involved) to the hollow shaft.

The device further comprises at least one bearing, or two or even three (or more) bearings, depending on the relative degree of rotatability that the bearing or bearings provides. In the case of a two bearing design, the interior of a first and second bearing, i.e. the inner ring of the first and second bearing is fixed onto the hollow shaft.

In terms of the meaning of the word "bearing", it is meant to cover any type of bearing that allows for easy axial rotation of one member with respect to another, and includes ball bearings, roller bearings, sleeve bearings, etc.

In a two bearing design, the second bearing is spaced apart from the first bearing, i.e. they are not in direct contact. The exterior of at least one bearing, i.e. the outer ring, is in (direct or indirect) contact with the interior of a hollow stationary part. The stationary part has a thread, which can be screwed together with the counter thread of a cap or cap nut. In consequence, the cap may apply an axial clamping force onto the bearings, when tightened.

Advantageously, this rotatable connector device can be easily assembled and disassembled.

According to a preferred embodiment of the device, a third bearing is mounted between the first and the second bearings and spaces the first and second bearings apart.

According to another preferred embodiment of the device, a washer spaces the first and second bearing apart.

According to another embodiment of the device, the hollow shaft has an inner stop on the exterior surface and an inner ring of the first bearing is aligned with the inner stop.

According to another embodiment of the device, the stationary part has an outer stop on the interior surface, and an outer ring of the first bearing is aligned with the outer stop.

According to another embodiment of the device, the bearing(s) are press fitted onto the hollow shaft and/or the stationary part.

According to another embodiment of the device, a fiber connector is designed to fix and align the fiber with the hollow shaft and the fiber connector is therefore mechanically connected to the hollow shaft and the fiber.

According to another embodiment of the device, the fiber connector is connected to the fiber by means of a centric tube part/nut/recess having a circular or according to other embodiments of the invention, a polygonal cross section. Preferably the fiber connector is connected to a hollow cylindrical tube carrying the fiber within. In this context, the fiber connector preferably comprises a centrically located nut having a circular cross section which is adapted to receive the cylindrical tube carrying the fiber. A cap nut having an interior thread is preferably attached to the cylindrical tube of the fiber and is screwed onto an external thread of the centrically located nut of the fiber connector.

According to another embodiment of the device, the centrically located nut or tube part of the fiber connector contains a notch and the cylindrical tube carrying the fiber comprises a tongue in order to prevent rotation between the fiber connector and the fiber.

According to another embodiment of the device, the fiber connector is connected to the hollow shaft by at least one axially, eccentrically positioned screw.

According to another embodiment of the device, the hollow shaft, the cap and/or at least one of the bearings or the washer is/are made of any suitable metal, including but not limited to stainless steel. As an alternative, a hard plastic or polymeric material may also be implemented, as desired.

According to another embodiment of the device, the stationary part provides connection means for connecting the stationary part to a light or laser source in an adjustable manner so that the distance between the light source and the end face of the optical fiber can be adjusted.

According to another embodiment of the device, a fiber presence sensor or mechanical microswitch is attached to the stationary part.

Some embodiments relate to a system for rotatable light transmission, comprising a rotatable connector device according to one of the previous embodiments and an optical fiber. The latter is introduced into the hollow shaft and fixed to the fiber connector.

Advantageously, the system has a rotatable fiber input allowing the optical fiber to rotate about its axis and letting the user move the output of the fiber, usually connected to a handpiece, without applying any torsion to the fiber itself.

According to another embodiment of the system, the optical fiber has a core layer and a cladding layer. The core, and/or the cladding layers may be circular, rectangular, square, triangular or other polygonal cross section. Due to the stresses on a fiber of a polygonal shape experienced when the fiber is rotated, the rotatable connector of the present invention reduces if not eliminates any torsional stress by allowing the fiber to rotate, thus lessening or eliminating damage to the fiber during use in which the fiber is rotated or twisted.

According to another embodiment of the system, a tension/bend relief reaches from the interior of the hollow shaft to the outside of the device.

Another aspect of the invention is related to a rotatable light transmission system comprising a stationary part, a bearing or bearings of the types described above and a fiber having a core, and a cladding layer, the core and/or the cladding layer having a polygonal cross section, whereby the stationary part is adapted to be inserted into a suitable recess or opening in a laser device or console that produces a laser beam upon activation, the bearing or bearings having an inner and an outer ring whereby the outer ring is (directly or indirectly) attached to the stationary part and the inner ring is (directly or indirectly) attached to the optical fiber allowing the fiber to freely rotate about its axis. According to one embodiment, the bearing(s) can be mounted in the stationary part and fixed by a cap nut as mentioned above.

BRIEF DESCRIPTION OF THE FIGURES

Some embodiments of the rotatable connector device and the system will be described in the following by way of example only, and with reference to the accompanying figures, in which
FIG. 4a shows the assembled device of FIGS. 1-3 as mounted into a laser system and a square optical fiber.
FIG. 4b shows an end view of the assembled device with a square section optical fiber.

DETAILED DESCRIPTION

Various embodiments will now be described more fully with reference to the accompanying drawings in which some preferred embodiments are illustrated.

Figure 1A:
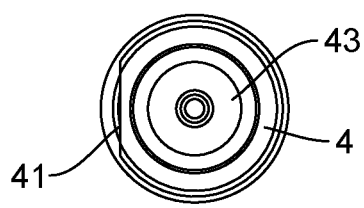
FIG. 1a shows a top view onto an assembled device.

FIG. 1a shows a bottom view of an assembled device comprising a centric hole 43 for introducing an optical fiber. The centric hole 43 may have a profile of the fiber or a tension/bend relief, where the fiber is led through. Further, a wrench notch 41 is visible, which may allow access for a wrench or other tool. The assembly shown in FIG. 1b, and in particular parts marked as 1, may be inserted into a suitable recess or opening in a laser device or console that produces a laser beam upon activation. The activated laser beam will enter along line or axis A-A at the point marked as 16 and in the direction of the arrow illustrated.

Figure 1B:
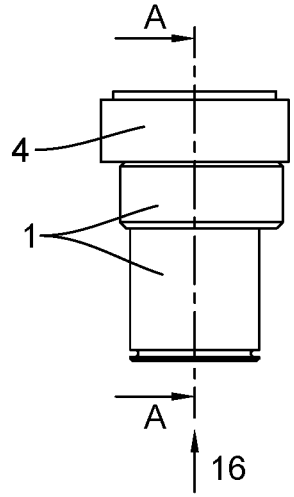
FIG. 1b shows a side view onto an assembled device.

FIG. 1b shows a side view of an assembled device, with the cap 4 and the stationary part 1 being connected. The cap 4 is well shown in FIG. 2b and assembles onto a threaded portion 12 to form the assembly shown in FIG. 1b.

Figure 1C:
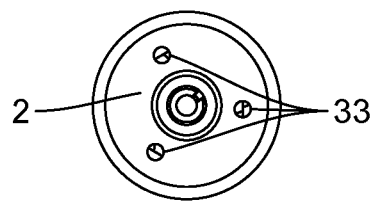
FIG. 1c shows a bottom view onto an assembled device.
Figure 2A:
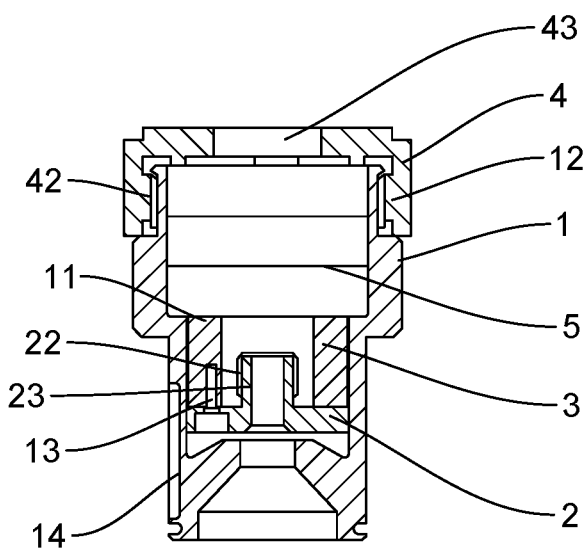
FIG. 2a shows a sectional view of an assembled device.
Figure 2B:
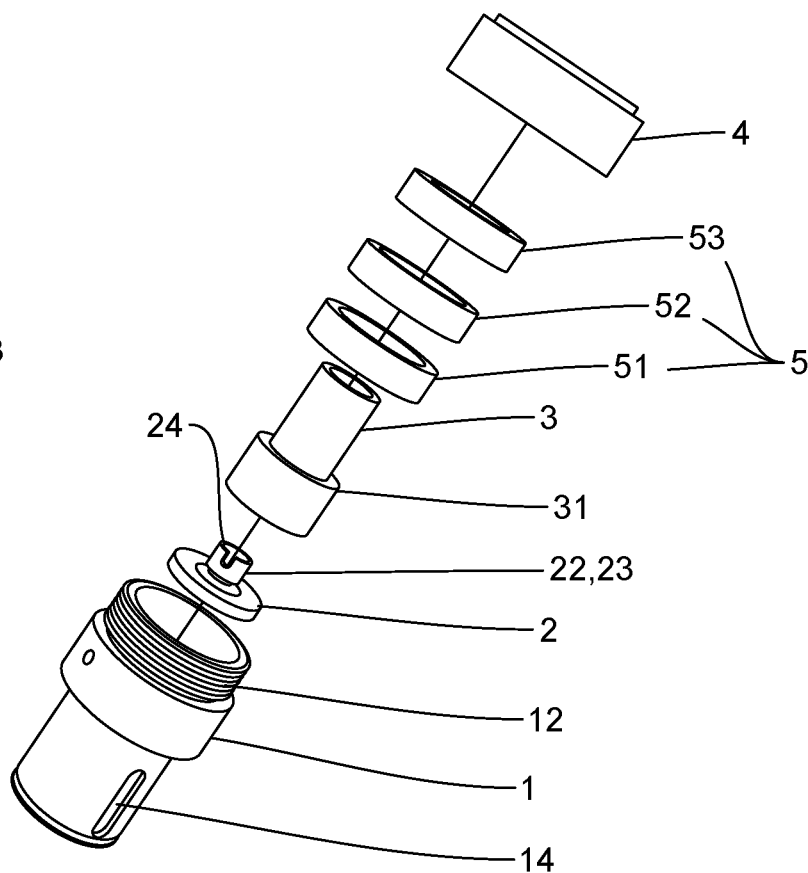
FIG. 2b shows an exploded view of a device.

FIG. 1c shows a bottom view of an assembled rotatable connector device, that is, the assembled version of the parts shown in FIG. 2b., viewed along the line A-A and in the direction of the arrow 16. The view shown in FIG. 1c is the bottom view of the part 2 illustrated in FIG. 2b, with a central aperture 33 formed in the part 2. This central aperture is for the purpose of transmitting a laser beam from the laser console or device into the assembly of FIGS. 2a and 2b. Screws or other joining devices 13 connect the part 12 to the part 31

FIG. 2a and FIG. 2b show a first embodiment of an assembly and comprising three bearings 5, namely a first (51), third (52) and second (53) bearing.

Figure 3A:
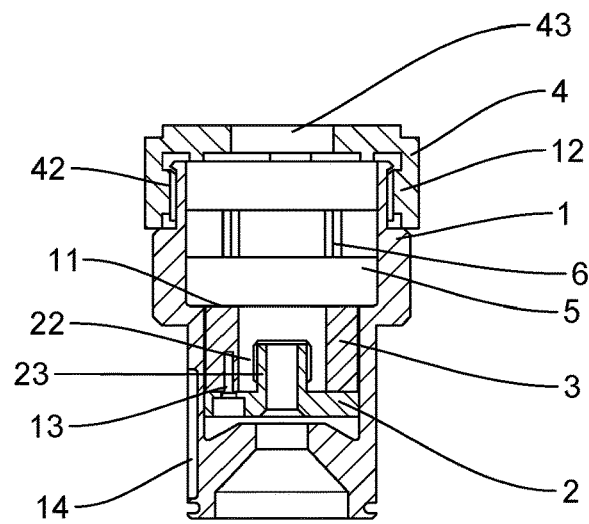
FIG. 3a shows a sectional view of another embodiment of an assembled device.
Figure 3B:
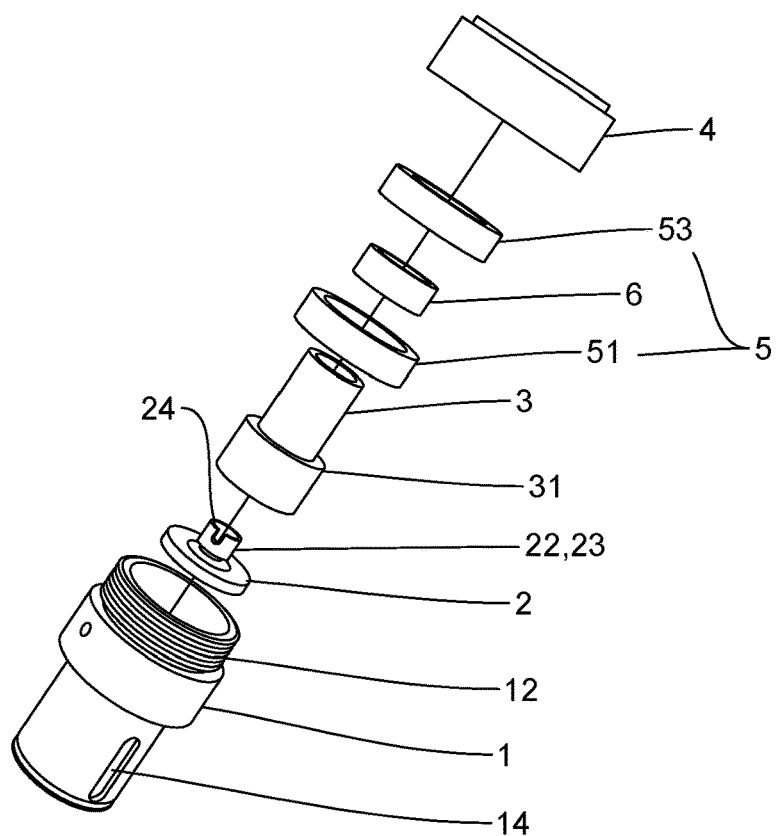
FIG. 3b shows an exploded view of another embodiment of a device.

FIG. 3a and FIG. 3b show a second embodiment comprising two bearings 5, namely a first (51) and second (53) bearing, separated by a washer 6.

As shown in FIGS. 2a, 2b and 3, a hollow shaft 3, usually made of metal, including but not limited to stainless steel, holds three ball bearings 5 as displayed in FIGS. 2a,2b, or two ball bearings 5 separated by a washer 6 as displayed in FIGS. 3a,3b, although a one bearing design may also be implemented. The bearings 5 may be attached with forced coupling by press fitting. The use of three or two ball bearings, whereas the two outermost bearings are spaced apart, guarantees an excellent axiality of the rotation movement and low friction. Alternatively, the use of a single bearing may be suitable, so long as the single bearing structure produces sufficient axiality of rotational movement.

However, as mentioned above, even a single bearing structure may be implemented instead of two or three bearing structures, when the circumstances make such structure feasible.

The bearings 5 may be made of any suitable metal and may be sealed in order to avoid any lubricant leaks, thus preventing contamination of the fiber and any focusing optics which may be attached to the connector. The bearings may also be made of a suitable plastic or polymeric material.

The fiber is installed onto a fiber connector 2 by means of a cap nut. Therefore, the fiber connector 2 has a centric nut/tube part 23 or shaft. The profile of it is aligned to the profile of the fiber. Preferably, a connection thread 22 on the exterior of the protruding tube part 23 is provided to attach (screw) a nut or cap nut attached to the fiber onto the connector 2. The cap nut itself is attached near the end of the fiber and is axially movable up to a stop. When screwing, the cap is pulling the stop towards the fiber connector 2, thus fixing it.

By using a flexible washer, like a rubber ring, the axial position of the end of the fiber can be adjusted by screwing more or less. The distance of the fiber end face from the connector output can be adjusted and fixed accordingly in order to keep a fixed distance from the focusing optics. The focusing optics is attached to the connector in an assembled state for use.

To prevent twisting or rotating of the fiber with respect to the fiber connector 2, the tubular part/nut 23 may contain a groove 24, for receiving a tongue attached to the end of the fiber that fits into part 23.

The fiber connector 2 is installed onto the hollow shaft 3 by means of screws 13 so that the fiber may rotate freely around its axis together with the fiber connector 2 and the hollow shaft 3, due to the presence of the ball bearings 5. At least one screw 13 (preferably three screws) is provided, which is axially aligned and eccentrically positioned, so that it can intrude into the solid shaft wall of the hollow shaft 3.

It is to be understood that an assembly of parts 2,3,31, 51,52 and 53, shown assembled in FIG. 2a and disassembled (exploded) in FIG. 2b form a unitary assembly in which the parts 2, 3, 22, 23, 24 and 31 are fixed to one another and are rotatable with respect to the assembled bearings 51, 52 and 53 (in FIGS. 2a and 2b) The same applies to the embodiment of FIGS. 3a and 3b, the difference being that there are 2 rather than three bearings.

The assemblage of parts 2, 3, 22, 23, 24 and 31 will receive a proximal end portion of an optical fiber into portions 22, 23 and 24. This assemblage is then introduced into the part 1 which may be fixed with a recess in the laser console. Then, part 4 is threaded onto threads 12. This action causes the bearings 51, 52 and 53 to become unmovable, but does allow the parts 2, 3,22,23,24 and 31 to freely rotate, this allowing the fiber itself fixed to this assemblage to also rotate.

The second bearing 51, in particular the outer ring at the top is clamped on the external section, in particular the rim, by a cap or cap nut 4, which usually is made of metal. It is screwed onto a threaded section, i.e. the counter thread 42 of the stationary part 1, which usually is made of a suitable metal, such as and including stainless steel or even a suitable plastic or polymeric material. If screwed together, the cap 4 together with an outer stop 11 are clamping the outer rings of the bearings 5 towards each other, thus fixing them axially, allowing the rotation of just the central section, including the hollow shaft 3, the fiber connector 2 and the fiber itself, via the inner rings of the bearings.

In addition, an additional hollow cap may be mounted on the distal end of the cap 4. This measure protects the section of the fiber cable within the assembly of FIGS. 2a and 2b.

On the stationary part 1 a fiber presence sensor, typically a mechanical micro-switch can be installed. The cap 4, when screwed/tightened to the end of the stationary part 1 will activate the switch, indicating the presence of the fiber.

A system comprising the rotatable connector described above in combination with an optical fiber is a second aspect of the present invention. The fiber reaches into the opening hole 43 into the inner lumen of the hollow shaft and into the fiber connector 2 where it is fixed in the mentioned way. Different profiles of fibers, core and/or cladding layers, can thus be used (e.g. round, square, rectangular or triangular), the outline/profile of the inner profile of the tube part 23 is designed accordingly. Advantageously also non-round optical fiber profiles can freely rotate with the proposed rotatable connector. In particular, and as mentioned above, fibers characterized by non-round profiles of their core and/or cladding layers, are susceptible to fractures when twisted and require the specific rotatable connector described above providing an excellent low friction untangle capabilities.

Turning now to FIG. 4a, this figure illustrates the insertion of the assemblies discussed herein mounted in a laser system 40. The laser system 40 includes a laser source 45, which through a mirror or mirror system 44 directs a laser beam 46 through the assembly 1, 4 and 14 and then through an optical fiber 48, which is shown for purposes of illustration only as a square cross-sectional fiber. It is to be understood that while a mirror 44 is illustrated, other ways of directing light beams are known (including direct beams) and are within the scope of the present invention.

In addition, while a square cross-sectional optical fiber is shown in FIGS. 4a and 4b, other shaped fibers may be used with the assemblies in the present invention. Such non-round polygonal-shaped fibers, including square fibers, are available and have been implemented in laser systems, including the Splendor X laser system of the assignee of the present invention, BIOS Srl. of Italy. Circular cross-sectional optical fibers may also be used with the assemblies of the present invention. When the present invention is used in connection with the above-mentioned laser system or other laser systems and a polygonal-shaped fiber, torsional stresses on the fiber are very much reduced or even eliminated, thus reducing or eliminating damage to the fiber in use.

The device described may be used for medical applications, where a light or laser source provides optical energy and this energy is transmitted to a handpiece. The rotatable connector may be attached to the outlet optics of the light source, thus leaving the attached fiber cable rotate freely. The optical fiber, which exits from the cap 4, optionally includes a tension relief or cone, which is connected to the handpiece. The optical energy emerges the optical fiber in the handpiece, optionally via an additional optic and is directed to a treatment target.

LIST OF REFERENCE NUMERALS

1 stationary part
11 outer stop
12 thread
13 screw
14 connection means
16 laser beam entry point
2 fiber connector
22 connection thread
23 tube part/nut
24 notch/groove
3 hollow shaft
31 inner stop
33 central aperture
4 cap, cap nut
41 wrench notch
42 counter thread
43 centric hole
5 bearings
51 first bearing
52 third bearing
53 second bearing
6 washer

LIST OF REFERENCE NUMERALS INCORPORATED IN THE CLAIMS

1. An assembly for rotatable mounting an optical fiber, comprising:
   a hollow shaft (3) for introducing an optical fiber, and means for holding and fixing the fiber mechanically to the hollow shaft (3), at least two bearings whereby the interior of a first bearing (51) and a second bearing (53) is fixed onto the hollow shaft (3), whereby the second bearing (53) is spaced apart from the first bearing (51), the exterior of at least one bearing (51, 53) is attached to the interior of a hollow stationary part (1), the stationary part (1) having a thread (12), which can be screwed together with a counter thread (42) located on a cap (4) or cap nut (4), the cap (4) thus applies an axial clamping force onto the bearings (5).

2. An assembly according to claim 1, characterized in that a third bearing (52) spaces the first (51) and second bearing (53) apart.

3. An assembly according to claim 1, characterized in that a washer (6) spaces the first (51) and second bearing (53) apart.

4. An assembly according to one of the previous claims, characterized in that, the hollow shaft (3) has an inner stop (31) on the exterior surface, and an inner ring of the first bearing (51) is aligned with the inner stop (31) and/or the stationary part (1) has an outer stop (11) on the interior surface and an outer ring of the first bearing (51) is aligned with the outer stop (11).

5. An assembly according to one of the previous claims, characterized in that, the bearings (51, 52, 53) are press fitted onto the hollow shaft (3) and/or stationary part (1).

6. An assembly according to one of the previous claims, characterized in that, a fiber connector (2) is designed to fix and align a fiber and the fiber connector (2) is mechanically connected to the hollow shaft (3).

7. An assembly according to claim 6, characterized in that, the fiber connector (2) is adapted to connect a fiber by means of a centric tube part/nut (23) with the profile of the fiber and comprises an exterior thread configured to screw a cap nut attached near the end of a fiber onto the tube part/nut (23).

8. An assembly according to claim 7, characterized in that, the tube part (23) contains a notch/groove (24), configured to receive a tongue attached to a fiber to prevent rotation between the fiber connector (2) and a fiber.

9. An assembly according to one of claims 6 to 8, characterized in that, the fiber connector (2) is connected to the hollow shaft (3) by at least one axially, eccentrically positioned screw (13).

10. An assembly according to one of the previous claims, characterized in that, the hollow shaft (2), the cap (4) and/or at least one of the bearings (5) or the washer (6) is/are constructed of metal, including stainless steel.

11. An assembly for rotatable mounting an optical fiber, comprising:
a hollow shaft (3) for introducing an optical fiber, and means for holding and fixing the fiber mechanically to the hollow shaft (3),
at least one bearing whereby the interior of the bearing (51) is fixed onto the hollow shaft (3),
the exterior of the at least one bearing (51) is attached to the interior of a hollow stationary part (1),
the stationary part (1) having a thread (12), which can be screwed together with a counter thread (42) located on a cap (4) or cap nut (4), the cap (4) thus applies an axial clamping force onto the bearing (51).

12. The assembly in accordance with any of the claims, wherein the bearing or bearings are constructed of a metal material, including but not limited to stainless steel.

13. The assembly in accordance with any of the claims, wherein the bearing or bearings are constructed of a hard plastic or polymeric material.

14. The assembly in accordance with any of the claims, wherein the bearing or bearings are of one of the types: roller, ball or sleeve bearings.

15. Rotatable light transmission system, comprising: an assembly according to one of the previous claims and an optical fiber introduced into the hollow shaft (3) and fixed to the fiber connector (2).

16. Rotatable light transmission system, according to claim 15, characterized in that, the optical fiber has rectangular, square, triangular or other polygonal cross section.

17. Rotatable light transmission system, according to claim 15 or 16, characterized in that, a tension/bend relief reaches from the interior of the hollow shaft (3) to the outside of the assembly.

18. Rotatable light transmission system comprising a stationary part, a bearing or bearings and a fiber having a core, and a cladding layer, the core and/or the cladding layer having a polygonal cross section, whereby the stationary part is adapted to be inserted into a suitable recess or opening in a laser device or console that produces a laser beam upon activation, the bearing or bearings having an inner and an outer ring whereby the outer ring is (directly or indirectly) mounted within the stationary part and the inner ring is (directly or indirectly) attached to the optical fiber.

19. The rotatable light transmission system of claim 18, wherein the stationary part is mounted into a laser system which includes a laser source, the laser source being activatable to cause a laser beam to emanate from the laser source, through the stationary part and then through a fiber having a polygonal core cross-section to a target for the laser beam.

The invention claimed is:

1. An assembly for the rotatable mounting of an optical fiber,
comprising:
a hollow shaft for introducing an optical fiber, the fiber being mechanically fixed to the hollow shaft,
at least two bearings whereby the interior of a first bearing and a second bearing is fixed onto the hollow shaft, whereby the second bearing is spaced apart from the first bearing,
the exterior of at least one bearing being attached to the interior of a hollow stationary part,
the stationary part having a thread, which is configured to be screwed together with a counter thread located on a cap or cap nut, the cap thus applying an axial clamping force onto the bearings,
wherein
the hollow shaft has an inner stop on the exterior surface, and an inner ring of the first bearing being aligned with the inner stop: and,
the stationary part has an outer stop on the interior surface and an outer ring of the first bearing being aligned with the outer stop.

2. The assembly according to claim 1, further comprising a third bearing that spaces the first and second bearing apart.

3. The assembly according to claim 1, further comprising a washer spacing the first and second bearings apart.

4. The assembly according to claim 3, wherein the hollow shaft, the cap and/or at least one of the bearings or the washer are constructed of metal, including stainless steel.

5. The assembly according to claim 1, wherein the bearings are press-fitted onto the hollow shaft and/or to the stationary part.

6. An assembly for the rotatable mounting of an optical fiber, comprising:

a hollow shaft for introducing an optical fiber, the fiber being mechanically fixed to the hollow shaft, at least one bearing whereby the interior of the bearing being fixed onto the hollow shaft, the exterior of the at least one bearing being attached to the interior of a hollow stationary part, the stationary part having a thread, which is configured to be screwed together with a counter thread located on a cap or cap nut, the cap thus applying an axial clamping force onto the bearing, wherein a fiber connector is configured to fix and align a fiber, the fiber connector further being mechanically connected to the hollow shaft.

7. The assembly in accordance with claim 6, wherein the bearing or bearings are constructed of a metal material, including but not limited to stainless steel.

8. The assembly in accordance with claim 6, wherein the bearing or bearings are constructed of a hard plastic or polymeric material.

9. The assembly in accordance with claim 6, wherein the bearing or bearings are of one of the types: roller, ball or sleeve bearings.

10. The assembly of claim 6, comprising an optical fiber that is introduced into the hollow shaft and fixed to the fiber connector.

11. The assembly of claim 6, wherein the optical fiber has one of: a rectangular, a square, a triangular or other polygonal cross section.

12. The assembly of claim 10, wherein a tension/bend relief reaches from the interior of the hollow shaft to the outside of the assembly.

13. An assembly for the rotatable mounting of an optical fiber, comprising:

a hollow shaft for introducing an optical fiber, the fiber being mechanically fixed to the hollow shaft, at least two bearings whereby the interior of a first bearing and a second bearing is fixed onto the hollow shaft, whereby the second bearing is spaced apart from the first bearing, the exterior of at least one bearing being attached to the interior of a hollow stationary part, the stationary part having a thread, which is configured to be screwed together with a counter thread located on a cap or cap nut, the cap thus applying an axial clamping force onto the bearings, wherein a fiber connector is configured to fix and align a fiber, the fiber connector further being mechanically connected to the hollow shaft.

14. The assembly of claim 13, the assembly including an optical fiber introduced into the hollow shaft and fixed to the fiber connector, the optical fiber being one of a: rectangular, square or other polygonal cross-section.

15. The assembly in accordance with claim 13, wherein the bearing or bearings are constructed of a metal material, including but not limited to stainless steel.

16. The assembly in accordance with claim 13, wherein the bearing or bearings are constructed of a hard plastic or polymeric material.

17. The assembly in accordance with claim 13, wherein the bearing or bearings are of one of the types: roller, ball or sleeve bearings.

18. The assembly according to claim 13, wherein the fiber connector is adapted to connect a fiber through a centric tube part/nut with the profile of the fiber, the fiber connector further comprising an exterior thread configured to screw a cap nut attached near the end of a fiber onto the tube part/nut.

19. The assembly according to claim 18, wherein the tube part contains a notch/groove and is configured to receive a tongue attached to a fiber to prevent rotation between the fiber connector and a fiber.

20. The assembly according to claim 13, wherein the fiber connector is connected to the hollow shaft by at least one axially, eccentrically positioned screw.

* * * * *